US012202052B2

(12) United States Patent
Tohkairin

(10) Patent No.: US 12,202,052 B2
(45) Date of Patent: Jan. 21, 2025

(54) BORING TOOL HOLDER AND TURNING TOOL

(71) Applicant: Sumitomo Electric Hardmetal Corp., Itami (JP)

(72) Inventor: Hitoshi Tohkairin, Itami (JP)

(73) Assignee: SUMITOMO ELECTRIC HARDMETAL CORP., Itami (JP)

(*) Notice: Subject to any disclaimer, the term of this patent is extended or adjusted under 35 U.S.C. 154(b) by 595 days.

(21) Appl. No.: 17/610,699

(22) PCT Filed: Apr. 23, 2020

(86) PCT No.: PCT/JP2020/017462
§ 371 (c)(1),
(2) Date: Nov. 12, 2021

(87) PCT Pub. No.: WO2020/230569
PCT Pub. Date: Nov. 19, 2020

(65) Prior Publication Data
US 2022/0241870 A1    Aug. 4, 2022

(30) Foreign Application Priority Data

May 15, 2019  (JP) ................................ 2019-092184

(51) Int. Cl.
*B23B 27/10* (2006.01)
*B23B 27/02* (2006.01)
(Continued)

(52) U.S. Cl.
CPC ............ *B23B 29/025* (2013.01); *B23B 27/02* (2013.01); *B23B 29/03* (2013.01)

(58) Field of Classification Search
CPC ....... B23B 29/025; B23B 29/03; B23B 29/04; B23B 27/02; B23B 2220/126; B23B 27/14; B23B 29/043; B23B 29/046; B23B 29/02
See application file for complete search history.

(56) References Cited

U.S. PATENT DOCUMENTS 3,663,116 A * 5/1972 Muller ................... B23B 29/022
408/143
4,896,892 A * 1/1990 Andrews ............. B23B 31/1075
279/83

(Continued)

FOREIGN PATENT DOCUMENTS

DE     202013100035 U1 *  4/2013  ............. B23B 29/03
JP     58-188106 U1     12/1983
(Continued)

OTHER PUBLICATIONS

International Search Report and Written Opinion mailed on Jun. 30, 2020, received for PCT Application PCT/JP2020/017462, Filed on Apr. 23, 2020, 10 pages including English Translation.

*Primary Examiner* — Sara Addisu
(74) *Attorney, Agent, or Firm* — XSENSUS LLP

(57) ABSTRACT

A boring tool holder has a base member and a cutting insert holding member. The base member has a first main surface and a second main surface opposite to the first main surface. The cutting insert holding member is contiguous to the base member on the first main surface, and disposed in a circumferential direction of the base member as viewed in a direction from the first main surface toward the second main surface. A cross-sectional area of the base member in a cross section perpendicular to the direction from the first main surface toward the second main surface and intersecting the base member is larger than a cross-sectional area of the cutting insert holding member in a cross section perpen-
(Continued)

dicular to the direction from the first main surface toward the second main surface and intersecting the cutting insert holding member.

16 Claims, 12 Drawing Sheets

(51) Int. Cl.
   *B23B 29/02* (2006.01)
   *B23B 29/03* (2006.01)

(56) References Cited

U.S. PATENT DOCUMENTS

| | | | | |
|---|---|---|---|---|
| 5,642,651 | A * | 7/1997 | Von Haas | B23B 29/04 82/158 |
| 6,076,999 | A * | 6/2000 | Hedberg | B23B 27/007 407/66 |
| 7,059,809 | B2 * | 6/2006 | Oettle | B23B 29/022 407/11 |
| 7,121,768 | B2 * | 10/2006 | Hole | B23B 27/007 82/158 |
| 8,042,437 | B2 * | 10/2011 | Maier | B23B 29/043 408/239 R |
| 8,302,515 | B2 * | 11/2012 | Travez | B23B 29/04 408/239 R |
| 8,978,527 | B2 * | 3/2015 | Yang | B23B 27/10 82/904 |
| 2003/0206777 | A1 * | 11/2003 | Gyllengahm | B23B 29/043 407/102 |
| 2005/0109182 | A1 | 5/2005 | Murakami et al. | |
| 2007/0101839 | A1 * | 5/2007 | Travez | B23B 29/04 82/158 |
| 2008/0038072 | A1 * | 2/2008 | Berminge | B23B 27/10 407/103 |
| 2009/0035075 | A1 * | 2/2009 | Hecht | B23B 29/043 407/104 |
| 2010/0254774 | A1 * | 10/2010 | Hecht | B23B 27/007 407/101 |
| 2011/0200408 | A1 * | 8/2011 | Hecht | B23B 31/11 409/234 |
| 2011/0222979 | A1 * | 9/2011 | Stadelmann | B23B 29/03 407/408/147 |
| 2017/0232524 | A1 * | 8/2017 | Makhlin | B23B 27/1622 407/114 |
| 2018/0281075 | A1 * | 10/2018 | Kertsman | B23B 27/1622 |
| 2021/0379672 | A1 * | 12/2021 | Kimmich | B23B 31/1075 |
| 2023/0219145 | A1 * | 7/2023 | Suzuki | B23B 27/14 407/30 |
| 2024/0100604 | A1 * | 3/2024 | Hagiwara | B23B 29/04 |

FOREIGN PATENT DOCUMENTS

| | | | |
|---|---|---|---|
| JP | 2-47108 U1 | 3/1990 | |
| JP | 2005-177973 A | 7/2005 | |
| JP | 2010-535638 A | 11/2010 | |
| JP | 2012-516244 A | 7/2012 | |
| WO | WO-9951379 A1 * | 10/1999 | B23B 29/04 |
| WO | 2009/019677 A1 | 2/2009 | |
| WO | 2010/090385 A1 | 8/2010 | |
| WO | WO-2017183592 A1 * | 10/2017 | B23B 27/007 |

* cited by examiner

BORING TOOL HOLDER AND TURNING TOOL

CROSS-REFERENCE TO RELATED APPLICATIONS

The present application is based on PCT filing PCT/JP2020/017462, filed Apr. 23, 2020, which claims priority to JP 2019-092184, filed May 15, 2019, the entire contents of each are incorporated herein by reference.

TECHNICAL FIELD

The present disclosure relates to a boring tool holder and a turning tool. The present application claims priority based on Japanese Patent Application No. 2019-092184 filed on May 15, 2019. The entire contents described in the Japanese patent applications are incorporated herein by reference.

BACKGROUND ART

Japanese Patent Laid-Open No. 2005-177973 (PTL 1) discloses a boring tool for processing an inner diameter. The boring tool has an elongate holder having a tip provided with a throwaway chip.

CITATION LIST

Patent Literature

[PTL 1] Japanese Patent Laid-Open No. 2005-177973

SUMMARY OF INVENTION

The presently disclosed boring tool holder comprises a base member and a cutting insert holding member. The base member has a first main surface and a second main surface opposite to the first main surface. The cutting insert holding member is contiguous to the base member on the first main surface, and disposed in a circumferential direction of the base member as viewed in a direction from the first main surface toward the second main surface. A cross-sectional area of the base member in a cross section perpendicular to the direction from the first main surface toward the second main surface and intersecting the base member is larger than a cross-sectional area of the cutting insert holding member in a cross section perpendicular to the direction from the first main surface toward the second main surface and intersecting the cutting insert holding member.

DETAILED DESCRIPTION

Figure 1:
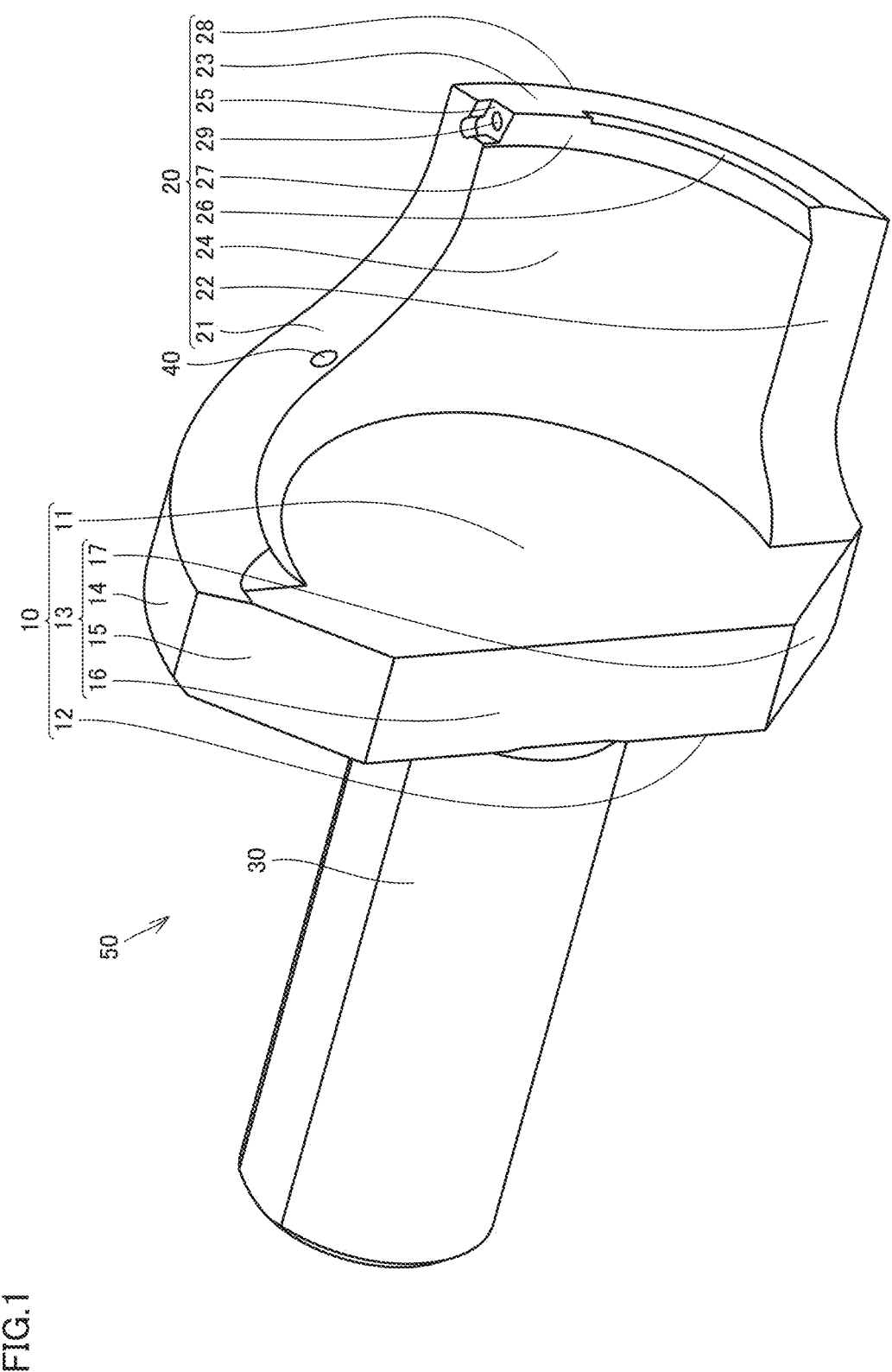
FIG. 1 is a schematic perspective view showing a configuration of a boring tool holder according to a first embodiment.

Problem to be Solved by the Present Disclosure

Boring tool holders and turning tools are required to be further improved in rigidity.

It is an object of the present disclosure to provide a boring tool holder and a turning tool capable of improving rigidity.

Advantageous Effect of the Present Disclosure

According to the present disclosure, a boring tool holder and a turning tool capable of improving rigidity can be provided.

Description of Embodiments of the Present Disclosure

Initially, embodiments of the present disclosure will be enumerated and specifically described.

(1) A boring tool holder 50 according to the present disclosure comprises a base member 10 and a cutting insert holding member 20. Base member 10 has a first main surface 11 and a second main surface 12 opposite to first main surface 11. Cutting insert holding member 20 is contiguous to base member 10 on first main surface 11, and disposed in a circumferential direction A of base member 10 as viewed in a direction from first main surface 11 toward second main surface 12. Base member 10 is larger in area than cutting insert holding member 20 in cross section perpendicular to the direction from first main surface 11 toward second main surface 12. That is, a cross-sectional area of base member 10 in a cross section perpendicular to the direction from first main surface 11 toward second main surface 12 and intersecting base member 10 is larger than a cross-sectional area of cutting insert holding member 20 in a cross section perpendicular to the direction from first main surface 11 toward second main surface 12 and intersecting cutting insert holding member 20.

According to boring tool holder 50 according to item (1), cutting insert holding member 20 is disposed in circumferential direction A of base member 10. When this is compared with using an elongate rod-shaped holder, the former can enhance cutting insert holding member 20 in rigidity. Further, when cut along a plane perpendicular to the direction from first main surface 11 toward second main surface 12, base member 10 has a cross-sectional area larger than that of cutting insert holding member 20. Cutting insert holding member 20 held by base member 10 having a cross-sectional area larger than that of cutting insert holding member 20 can be firmly held. As a result, boring tool holder 50 can be enhanced in rigidity as a whole.

(2) Boring tool holder 50 according to item (1) may further comprise a shank member 30 contiguous to base member 10 on second main surface 12. Shank member 30 may be disposed without overlapping cutting insert holding member 20 as viewed in the direction from first main surface 11 toward second main surface 12. The direction from first main surface 11 toward second main surface 12 may be generally parallel to the longitudinal direction of shank member 30. First main surface 11 may be substantially perpendicular to the longitudinal direction of shank member 30.

(3) In boring tool holder 50 according to item (1) or (2), cutting insert holding member 20 may have a distal end surface 23 located on a side opposite to first main surface 11.

(4) In boring tool holder 50 according to item (3), distal end surface 23 may have a circumferential angle (a first circumferential angle θ1) of 45° or larger and 180° or smaller as viewed in the direction from first main surface 11 toward second main surface 12. This can suppress interference with a workpiece while increasing rigidity.

(5) In boring tool holder 50 according to item (3) or (4), cutting insert holding member 20 may have a first side end surface 21 contiguous to distal end surface 23. Further, cutting insert holding member 20 may have a second side end surface 22 opposite to first side end surface 21 in circumferential direction A First side end surface 21 may have a smaller distance to first main surface 11 as first side end surface 21 is farther away from distal end surface 23 in circumferential direction A. This forms a pocket on the side of first side end surface 21 of cutting insert holding member 20. Chips can be effectively ejected via the pocket.

(6) in boring tool holder 50 according to item (5), cutting insert holding member 20 may be provided with a cutting insert receiving recess 25. Further, cutting insert receiving recess 25 may have a bottom surface 4 contiguous to distal end surface 23. First side end surface 21 may be arcuate when cutting insert holding member 20 is viewed in a direction perpendicular to the direction from first main surface 11 toward second main surface 12 and parallel to bottom surface 4 of cutting insert receiving recess 25. When this is compared with first side end surface 21 of a right angle, the former can enhance cutting insert holding member 20 in rigidity.

(7) A turning tool 100 according to the present disclosure comprises boring tool holder 50 according to any one of items (1) to (6), and a cutting insert 1 attached to cutting insert holding member 20.

Detailed Description of Embodiments of the Present Disclosure

Hereinafter, embodiments of the present disclosure will more specifically be described with reference to the drawings. In the figures, identical or equivalent components are identically denoted and will not be described repeatedly.

First Embodiment

First, a configuration of boring tool holder 50 according to a first embodiment will be described. Boring tool holder 50 according to the first embodiment is a holder for outer-diameter machining.

Figure 2:
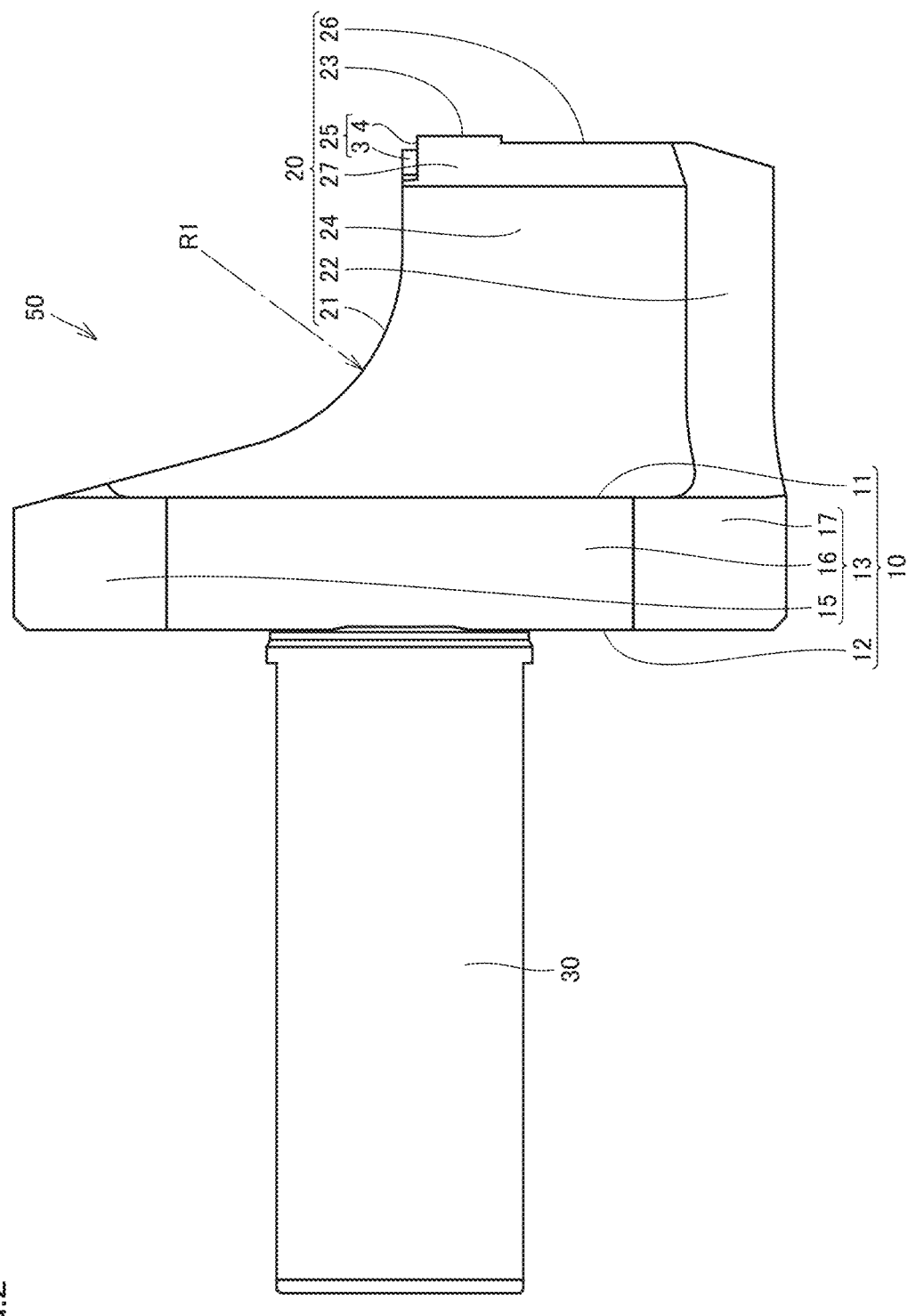
FIG. 2 is a schematic plan view showing the configuration of the boring tool holder according to the first embodiment.

FIG. 1 is a schematic perspective view showing a configuration of boring tool holder 50 according to the first embodiment. As shown in FIG. 1, boring tool holder 50 according to the first embodiment mainly comprises base member 10, cutting insert holding member 20, and shank member 30. Base member 10 has first main surface 11, second main surface 12, and a first external circumferential surface 13. FIG. 2 is a schematic plan view showing the configuration of boring tool holder 50 according to the first embodiment. As shown in FIG. 2, second main surface 12 is a surface opposite to first main surface 11. First external circumferential surface 13 is continuous to each of first main surface 11 and second main surface 12. As shown in FIGS. 1 and 2, first external circumferential surface 13 has a first notched surface 15, a second notched surface 16, a third notched surface 17, and a curved surface 14. Each of first notched surface 15, second notched surface 16, and third notched surface 17 is a flat surface. Curved surface 14 may for example be a part of a cylindrical surface.

Figure 3:
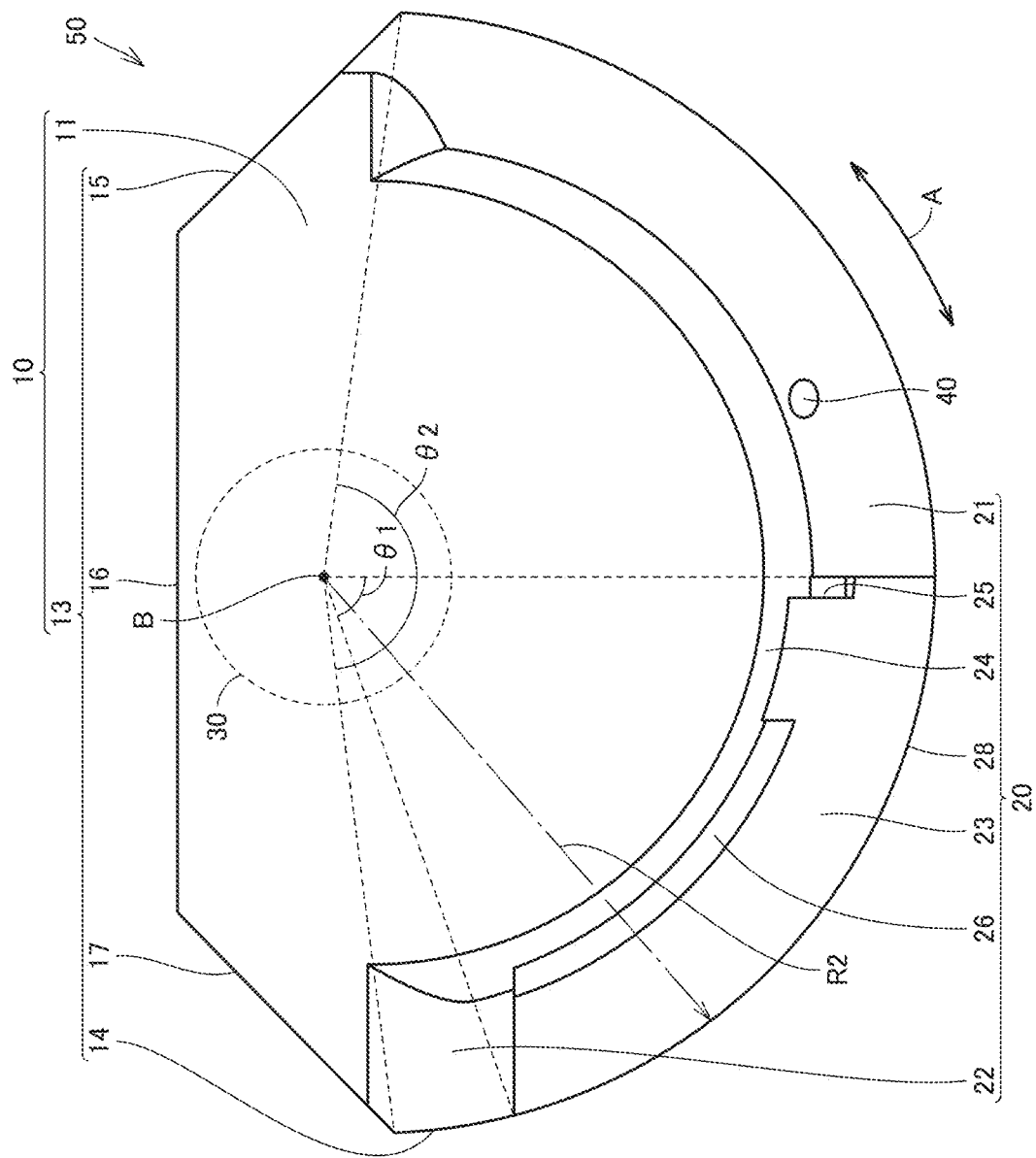
FIG. 3 is a schematic side view showing the configuration of the boring tool holder according to the first embodiment.

FIG. 3 is a schematic side view showing the configuration of boring tool holder 50 according to the first embodiment. As shown in FIG. 3, curved surface 14 is arcuate when viewed in the direction from first main surface 11 toward second main surface 12. First notched surface 15 is contiguous to curved surface 14. Second notched surface 16 is contiguous to first notched surface 15. Second notched surface 16 is inclined with respect to first notched surface 15. Third notched surface 17 is contiguous to second notched surface 16. Third notched surface 17 is inclined with respect to second notched surface 16. Third notched surface 17 is contiguous to curved surface 14. Second notched surface 16 is located between first notched surface 15 and third notched surface 17. As shown in FIG. 1, second notched surface 16 may be larger in area than each of first notched surface 15 and third notched surface 17.

Figure 4:
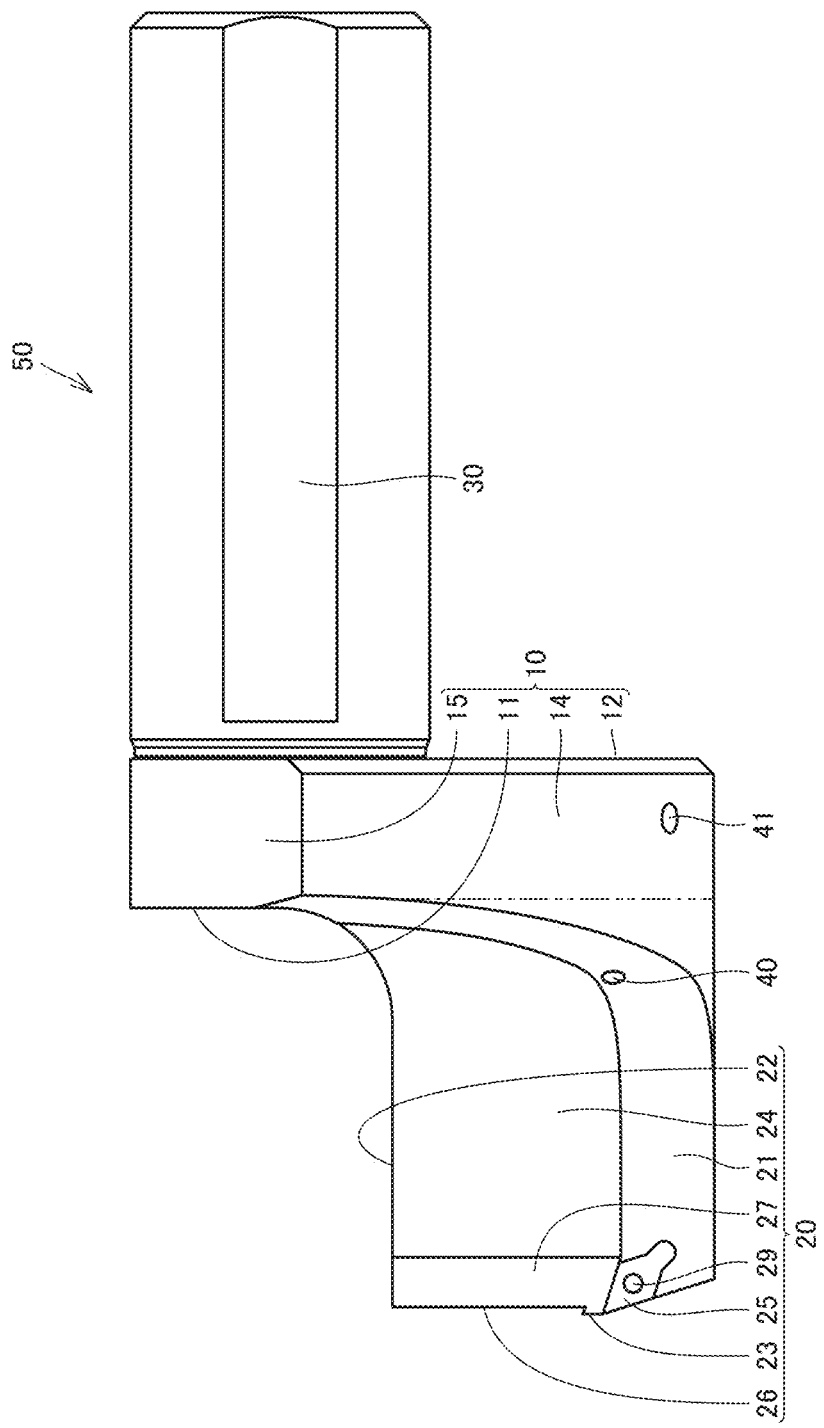
FIG. 4 is a schematic front view showing the configuration of the boring tool holder according to the first embodiment.

FIG. 4 is a schematic front view showing the configuration of boring tool holder 50 according to the first embodiment. As shown in FIG. 4, base member 10 may be provided with a coolant introduction hole 41. Specifically, coolant introduction hole 41 may be provided in curved surface 14 of base member 10, for example. Coolant introduction hole 41 is in communication with a coolant discharge hole 40. Coolant discharge hole 40 is provided in cutting insert holding member 20. Specifically, coolant discharge hole 40 is provided in first side end surface 21 of cutting insert holding member 20.

As shown in FIGS. 1 and 2, cutting insert holding member 20 is contiguous to base member 10 on first main surface 11. As shown in FIG. 3, when viewed in the direction from first main surface 11 toward second main surface 12, cutting insert holding member 20 is disposed in circumferential direction A. As shown in FIG. 4, cutting insert holding member 20 may be contiguous to curved surface 14 of base member 10. Cutting insert holding member 20 is provided in circumferential direction A of curved surface 14 that is arcuate, for example. Base member 10 is larger in area than cutting insert holding member 20 in cross section perpendicular to the direction from first main surface 11 toward second main surface 12.

As shown in FIG. 1, cutting insert holding member 20 has distal end surface 23, a front surface 26, first side end surface 21, second side end surface 22, a second external circumferential surface 28, a first internal circumferential surface 27, and a second internal circumferential surface 24. Distal end surface 23 is located on a side opposite to first main surface 11. Cutting insert holding member 20 is provided with cutting insert receiving recess 25. Cutting insert receiving recess 25 is provided with a screw hole 29. Distal end surface 23 is contiguous to cutting insert receiving recess 25. Distal end surface 23 is a most distal surface in a direction perpendicular to second main surface 12. Front surface 26 is contiguous to distal end surface 23. Front surface 26 is located closer to base member 10 than distal end surface 23 is (or behind distal end surface 23). Front surface 26 is spaced from cutting insert receiving recess 25.

Distal end surface 23 extends in circumferential direction A. First side end surface 21 is contiguous to distal end surface 23. Second side end surface 22 is opposite to first side end surface 21 in circumferential direction A. Second side end surface 22 is contiguous to distal end surface 23. In other words, first side end surface 21 is located on the side of one end of distal end surface 23 in circumferential direction A, and second side end surface 22 is located on the side of the other end of distal end surface 23 in circumferential direction A. First side end surface 21 is contiguous to cutting insert receiving recess 25. Second side end surface 22 is spaced from cutting insert receiving recess 25.

As shown in FIG. 1, first internal circumferential surface 27 is contiguous to first side end surface 21 and second side end surface 22. First internal circumferential surface 27 extends in circumferential direction A. First internal circumferential surface 27 is contiguous to distal end surface 23 and front surface 26. As shown in FIG. 2, in the direction perpendicular to second main surface 12, first internal circumferential surface 27 is located closer to first main surface 11 than distal end surface 23 is. In other words, first internal circumferential surface 27 is located between distal end surface 23 and first main surface 11 in the direction perpendicular to second main surface 12.

As shown in FIG. 1, second internal circumferential surface 24 is contiguous to first side end surface 21 and second side end surface 22. Second internal circumferential surface 24 extends in circumferential direction A. Second internal circumferential surface 24 is contiguous to first internal circumferential surface 27 and first main surface 11. Second internal circumferential surface 24 in circumferential direction A may have a width increasing from first internal circumferential surface 27 toward first main surface 11. As shown in FIG. 2, second internal circumferential surface 24 is located closer to first main surface 11 than first internal circumferential surface 27 is in the direction perpendicular to second main surface 12. In other words, second internal circumferential surface 24 is located between first internal circumferential surface 27 and first main surface 11 in the direction perpendicular to second main surface 12.

As shown in FIG. 2, shank member 30 is contiguous to base member 10 on second main surface 12. Shank member 30 is in the form of a cylinder for example. Shank member 30 extends in the direction perpendicular to second main surface 12. Base member 10 is located between shank member 30 and cutting insert holding member 20 in the direction perpendicular to second main surface 12.

As shown in FIG. 1, first side end surface 21 has a smaller distance to first main surface 11 as first side end surface 21 is farther away from distal end surface 23 in circumferential direction A. As shown in FIG. 2, cutting insert receiving recess 25 has a side surface 3 and bottom surface 4. Side surface 3 is contiguous to first side end surface 21. Bottom surface 4 is contiguous to distal end surface 23. As shown in FIG. 2, when viewed in a direction perpendicular to the direction from first main surface 11 toward second main surface 12 and parallel to bottom surface 4 of cutting insert receiving recess 25, first side end surface 21 may have an arcuate portion. First side end surface 21 has a radius of curvature (a first radius of curvature R1) for example of 5 mm or more and 40 mm or less.

As shown in FIG. 3, when viewed in the direction from first main surface 11 toward second main surface 12, base member 10 has curved surface 14 with a radius of curvature (a second radius of curvature R2) for example of 25 mm or more and 150 mm or less. First radius of curvature R1 may be 10 times or more and 30 times or less second radius of curvature R2.

As shown in FIG. 3, when viewed in the direction from first main surface 11 toward second main surface 12, distal end surface 23 has a circumferential angle (a first circumferential angle θ1) for example of 45° or larger and 90° or smaller. Although the lower limit for first circumferential angle θ1 is not particularly limited, it may for example be 50° or larger, or 60 or larger. Although the upper limit for first circumferential angle θ1 is not particularly limited, it may for example be 80° or smaller, or 70° or smaller. As shown in FIG. 3, when viewed in the direction from first main surface 11 toward second main surface 12, curved surface 14 has a circumferential angle (a second circumferential angle θ2) for example of 90° or larger and 180° or smaller. Second circumferential angle θ2 is larger than first circumferential angle θ1. Second circumferential angle θ2 may for example be twice first circumferential angle θ1.

As shown in FIG. 3, shank member 30 may be disposed without overlapping cutting insert holding member 20 when viewed in the direction from first main surface 11 toward second main surface 12. Specifically, shank member 30 may be disposed so as to overlap a center B of a circle including curved surface 14 when viewed in the direction from first main surface 11 toward second main surface 12.

Figure 5:
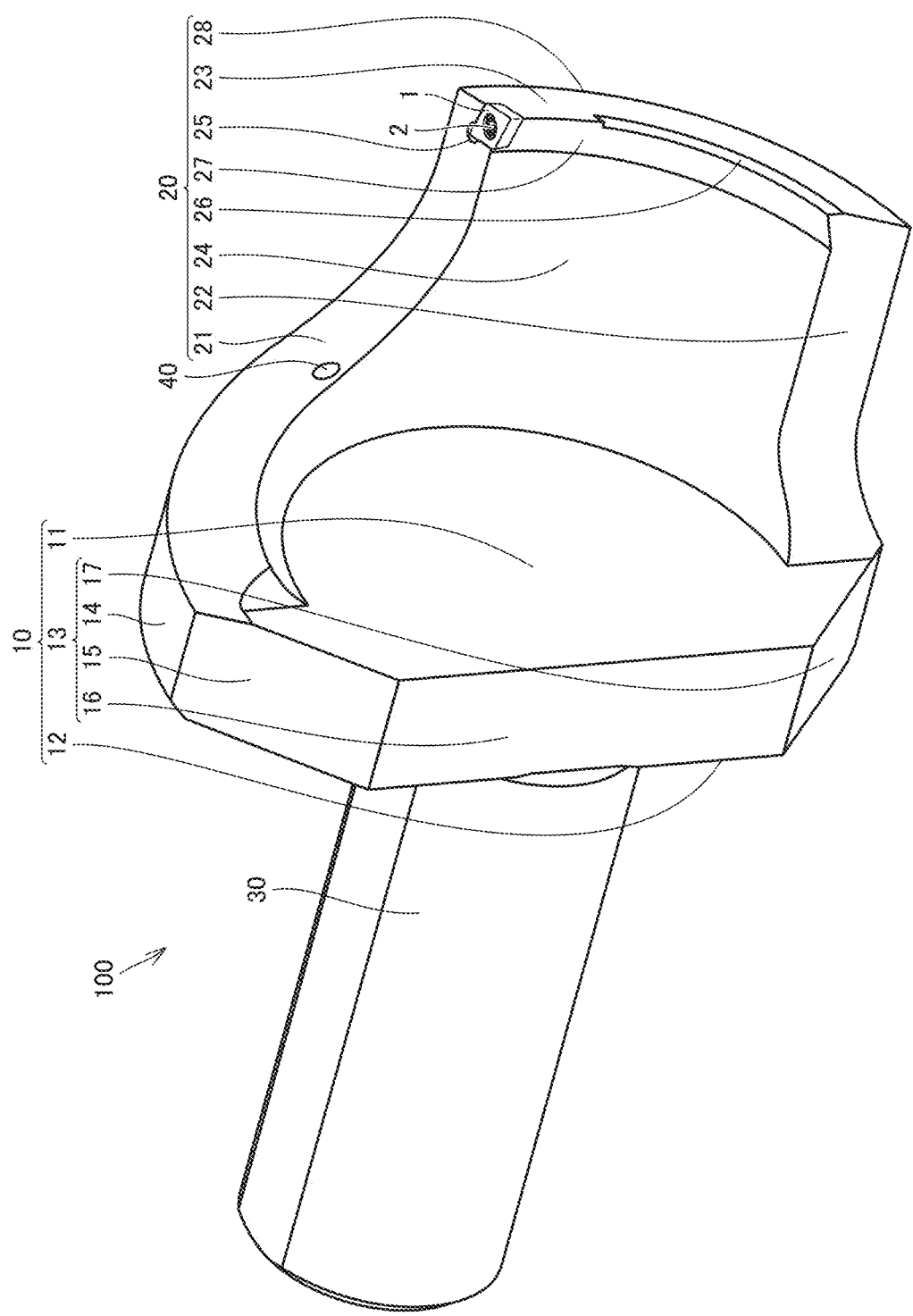
FIG. 5 is a schematic perspective view showing a configuration of a turning tool according to the first embodiment.

Hereinafter, a configuration of turning tool 100 according to the first embodiment will be described. FIG. 5 is a schematic perspective view showing the configuration of turning tool 100 according to the first embodiment. As shown in FIG. 5, turning tool 100 according to the first embodiment mainly comprises boring tool holder 50 according to the first embodiment, a cutting insert 1, and a fixing member 2. Cutting insert 1 is attached to cutting insert holding member 20. Cutting insert 1 is fixed to cutting insert holding member 20 by using fixing member 2. Fixing member 2 is, for example, a screw. Cutting insert 1 is disposed in cutting insert receiving recess 25. When cutting insert 1 is disposed in cutting insert receiving recess 25, fixing member 2 is screwed into screw hole 29.

As shown in FIG. 5, cutting insert receiving recess 25 is provided at a location where distal end surface 23, first side end surface 21, and first internal circumferential surface 27 meet one another. In this case, cutting insert 1 is disposed so as to project radially inward from first internal circumferential surface 27.

Hereinafter, a method for cutting a workpiece using boring tool holder 50 according to the first embodiment will be described.

Figure 6:
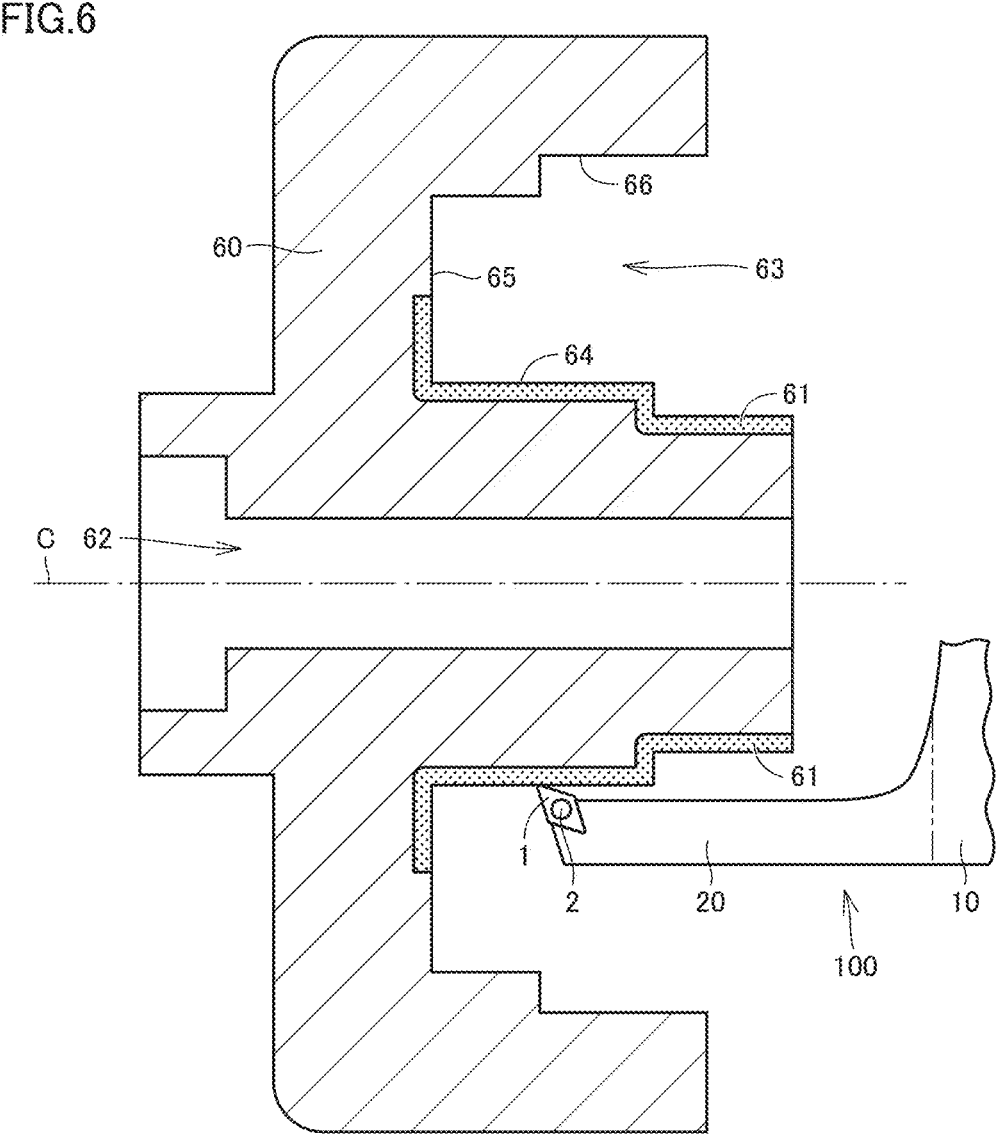
FIG. 6 is a schematic partial cross section showing a method for cutting a workpiece with the turning tool according to the first embodiment.

FIG. 6 is a schematic partial cross section showing a method for cutting a workpiece with turning tool 100 according to the first embodiment. A workpiece 60 is a component for an automatic transmission. As shown in FIG. 6, workpiece 60 is provided with an annular groove 63 and a through hole 62. Annular groove 63 surrounds through hole 62. Annular groove 63 is defined by an inner circumferential surface 66, an outer circumferential surface 64, and a bottom surface 65. Workpiece 60 rotates about an axis of rotation C. Turning tool 100 does not rotate, and instead provides a vertical movement, a lateral movement or a combination thereof to provide a translational movement in the plane of the sheet of FIG. 6.

Cutting insert 1 is disposed in cutting insert receiving recess 25 provided in boring tool holder 50. Cutting insert 1 held by boring tool holder 50 is pressed against outer circumferential surface 64 of annular groove 63 to cut outer circumferential surface 64. Cutting insert 1 is pressed against bottom surface 65 of annular groove 63 to cut about half of bottom surface 65. In FIG. 6, a portion 61 to be worked is cut by cutting insert 1.

Second Embodiment

Hereinafter, a configuration of boring tool holder 50 according to a second embodiment will be described. Boring tool holder 50 according to the second embodiment is a holder for inner-diameter machining. Boring tool holder 50 according to the second embodiment is different from boring tool holder 50 according to the first embodiment mainly in that cutting insert receiving recess 25 is located on an outer circumferential side, and boring tool holder 50 according to the second embodiment has a remainder in configuration similar to that of boring tool holder 50 according to the first embodiment. Hereinafter, a configuration different from that of boring tool holder 50 according to the first embodiment will mainly be described.

Figure 7:
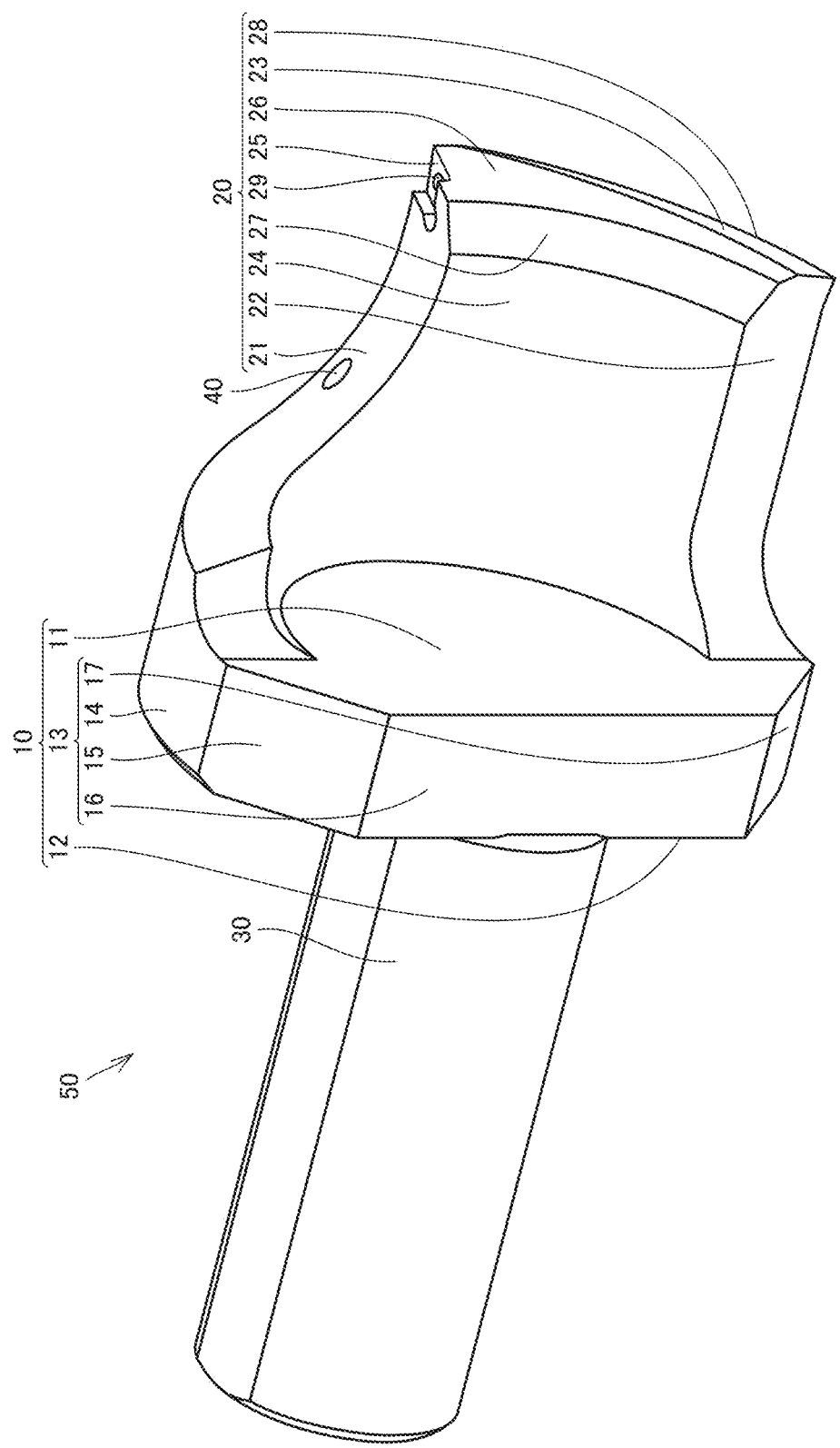
FIG. 7 is a schematic perspective view showing a configuration of a boring tool holder according to a second embodiment.

FIG. 7 is a schematic perspective view showing the configuration of boring tool holder 50 according to the second embodiment. As shown in FIG. 7, boring tool holder 50 according to the second embodiment mainly comprises base member 10, cutting insert holding member 20, and shank member 30.

As shown in FIG. 7, cutting insert holding member 20 has distal end surface 23, front surface 26, first side end surface 21, second side end surface 22, second external circumferential surface 28, first internal circumferential surface 27, and second internal circumferential surface 24. Distal end surface 23 is located on a side opposite to first main surface 11. Cutting insert holding member 20 is provided with cutting insert receiving recess 25. Distal end surface 23 may be spaced from cutting insert receiving recess 25. Distal end surface 23 is a most distal surface in the direction perpendicular to second main surface 12. Front surface 26 is contiguous to distal end surface 23. Front surface 26 is located closer to base member 10 than distal end surface 23 is (or behind distal end surface 23). Front surface 26 is contiguous to cutting insert receiving recess 25.

Distal end surface 23 and front surface 26 extend in circumferential direction A. First side end surface 21 is contiguous to front surface 26. Second side end surface 22 is opposite to first side end surface 21 in circumferential direction A. Second side end surface 22 is contiguous to distal end surface 23 and front surface 26. In other words, first side end surface 21 is located on the side of one end of front surface 26 in circumferential direction A, and second side end surface 22 is located on the side of the other end of front surface 26 in circumferential direction A. First side end surface 21 is contiguous to cutting insert receiving recess 25. Second side end surface 22 is spaced from cutting insert receiving recess 25.

As shown in FIG. 7, first internal circumferential surface 27 is contiguous to first side end surface 21 and second side end surface 22. First internal circumferential surface 27 extends in circumferential direction A. First internal circumferential surface 27 is contiguous to front surface 26. First internal circumferential surface 27 is spaced from distal end surface 23. Front surface 26 is located between first internal circumferential surface 27 and distal end surface 23. Front surface 26 is contiguous to first internal circumferential surface 27 and distal end surface 23.

Figure 8:
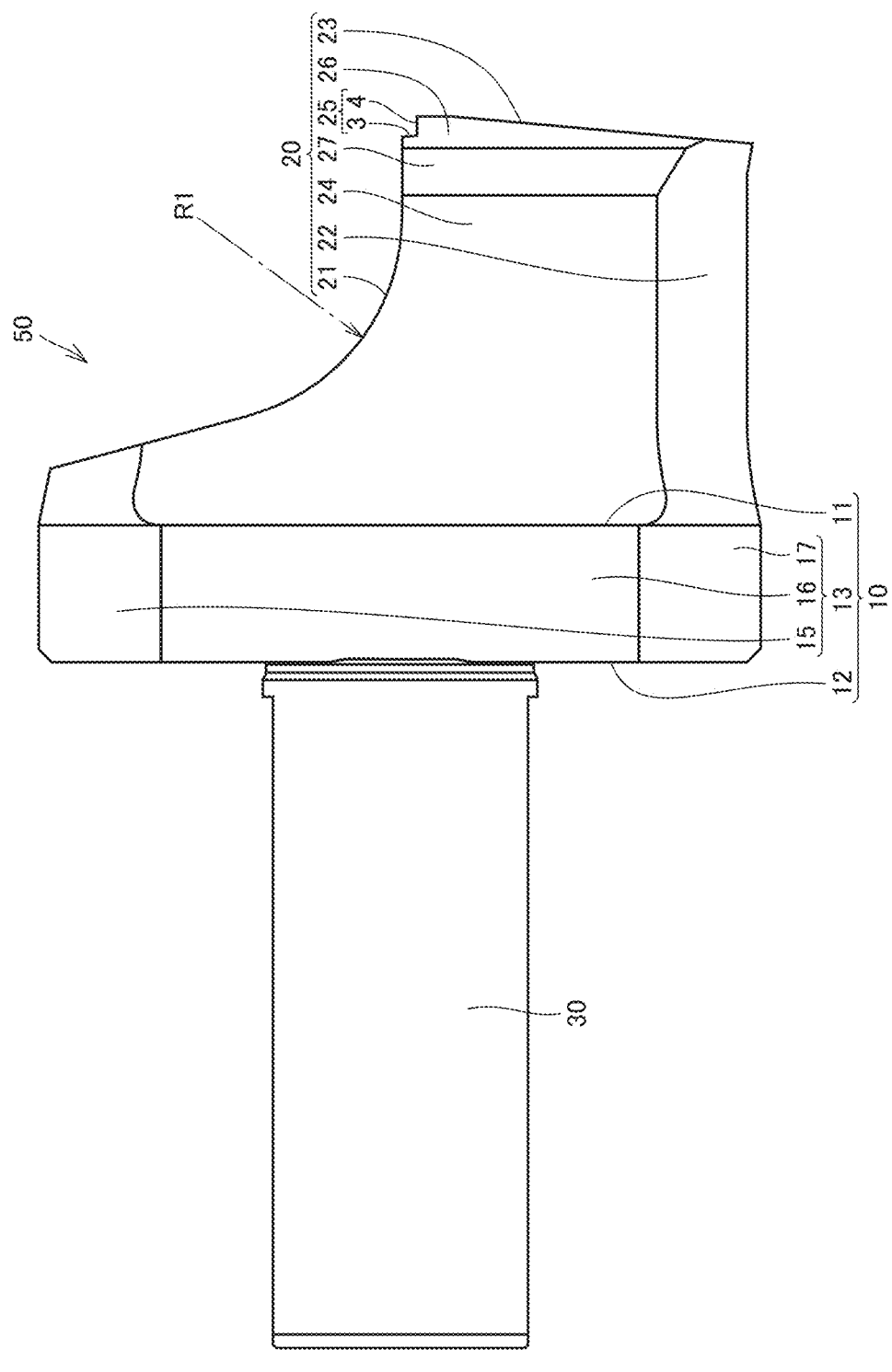
FIG. 8 is a schematic plan view showing the configuration of the boring tool holder according to the second embodiment.

FIG. 8 is a schematic plan view showing the configuration of boring tool holder 50 according to the second embodiment. As shown in FIG. 8, in the direction perpendicular to second main surface 12, front surface 26 is located closer to first main surface 11 than distal end surface 23 is. In other words, front surface 26 is located between distal end surface 23 and first main surface 11 in the direction perpendicular to second main surface 12. In the direction perpendicular to second main surface 12, first internal circumferential surface 27 is located closer to first main surface 11 than front surface 26 is. In other words, first internal circumferential surface 27 is located between front surface 26 and first main surface 11 in the direction perpendicular to second main surface 12.

Figure 9:
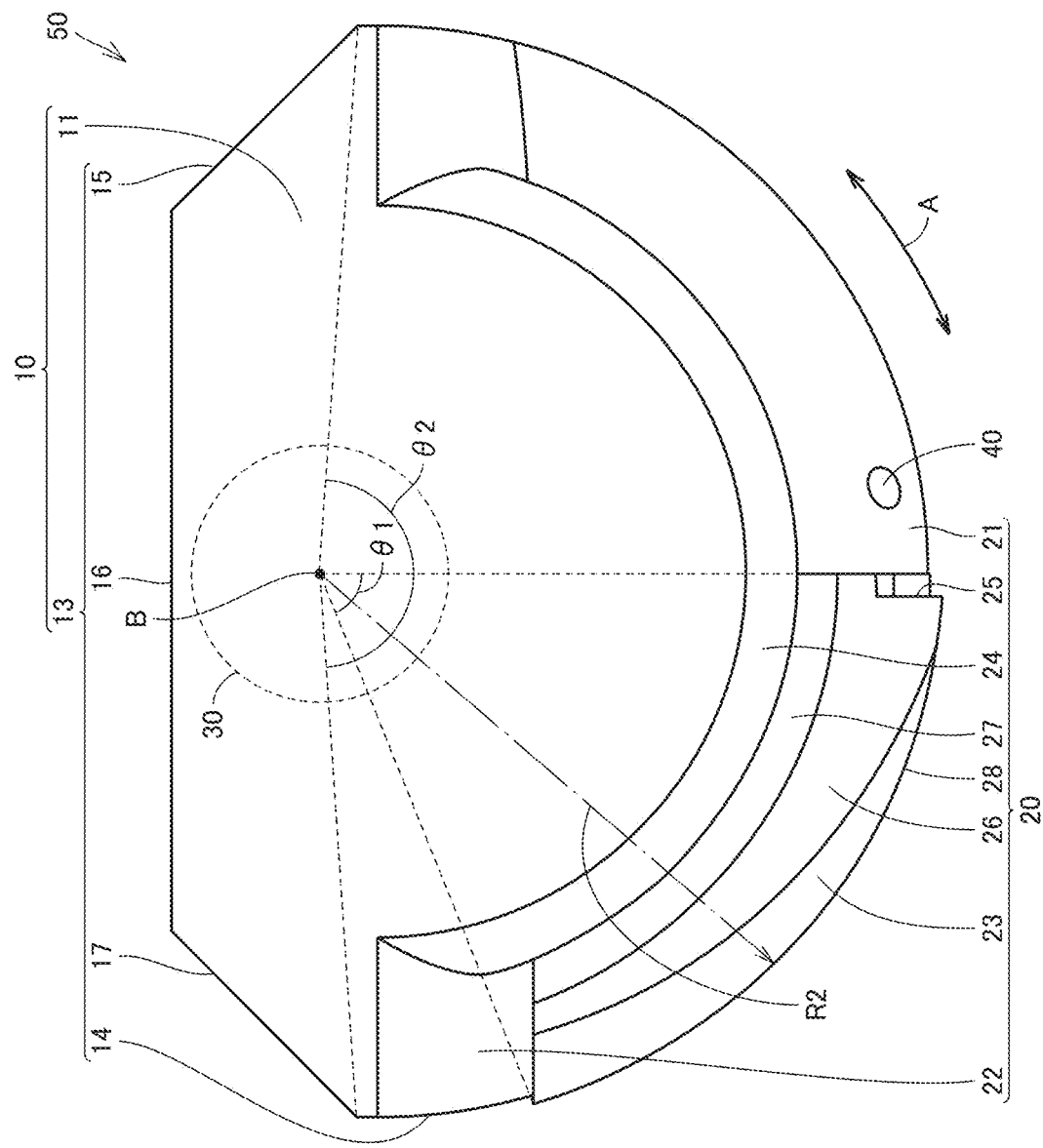
FIG. 9 is a schematic side view showing the configuration of the boring tool holder according to the second embodiment.
Figure 10:
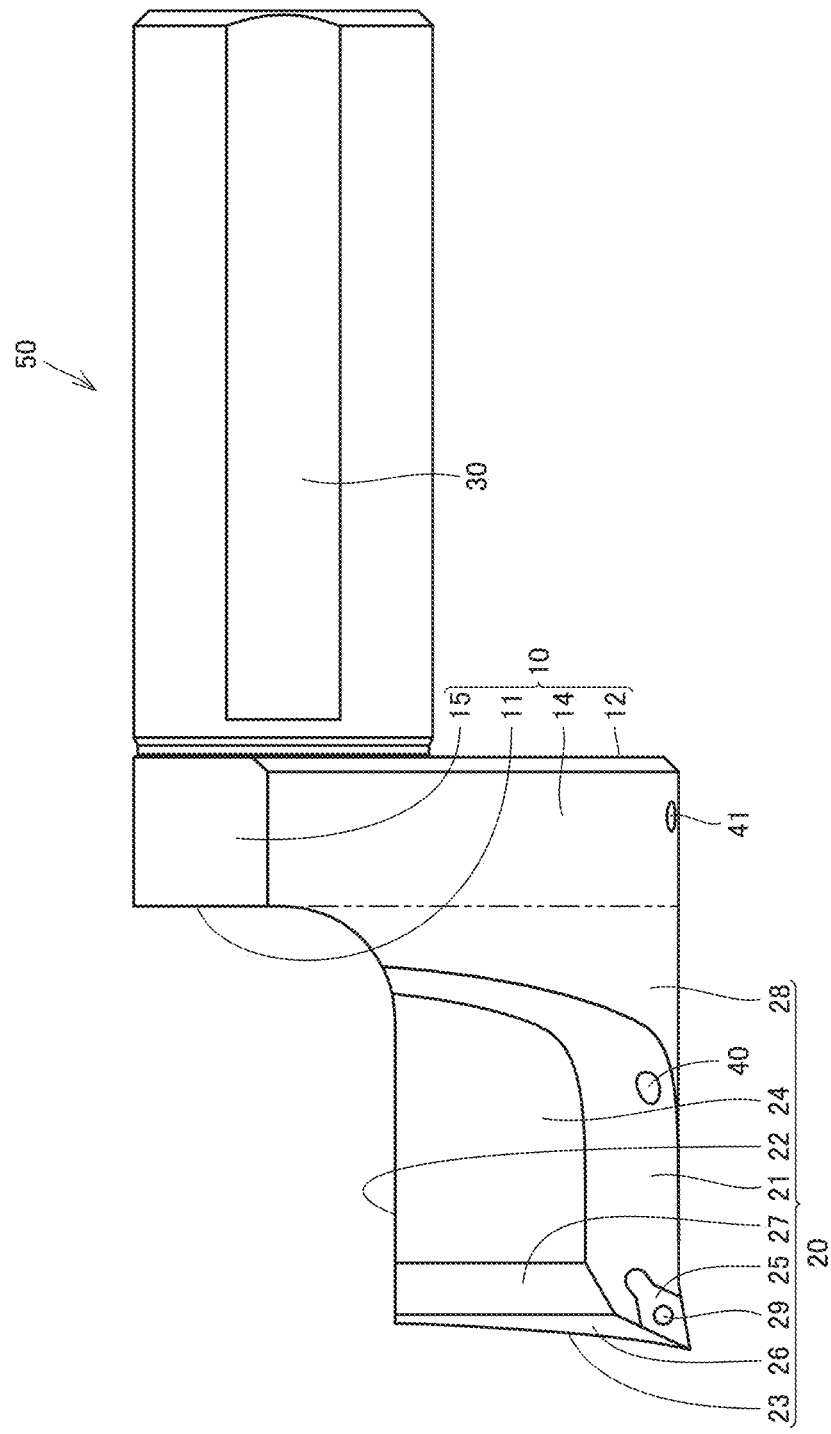
FIG. 10 is a schematic front view showing the configuration of the boring tool holder according to the second embodiment.

FIG. 9 is a schematic side view showing the configuration of boring tool holder 50 according to the second embodiment. As shown in FIG. 9, front surface 26 is located radially inwardly of distal end surface 23. First internal circumferential surface 27 is located radially inwardly of front surface 26. Second internal circumferential surface 24 is located radially inwardly of first internal circumferential surface 27. As shown in FIG. 9, distal end surface 23 may have a portion located on a side radially outer than curved surface 14 of base member 10. FIG. 10 is a schematic front view showing the configuration of boring tool holder 50 according to the second embodiment. As shown in FIG. 10, cutting insert receiving recess 25 is located on a radially outer side. Specifically, cutting insert receiving recess 25 is contiguous to second external circumferential surface 28.

Figure 11:
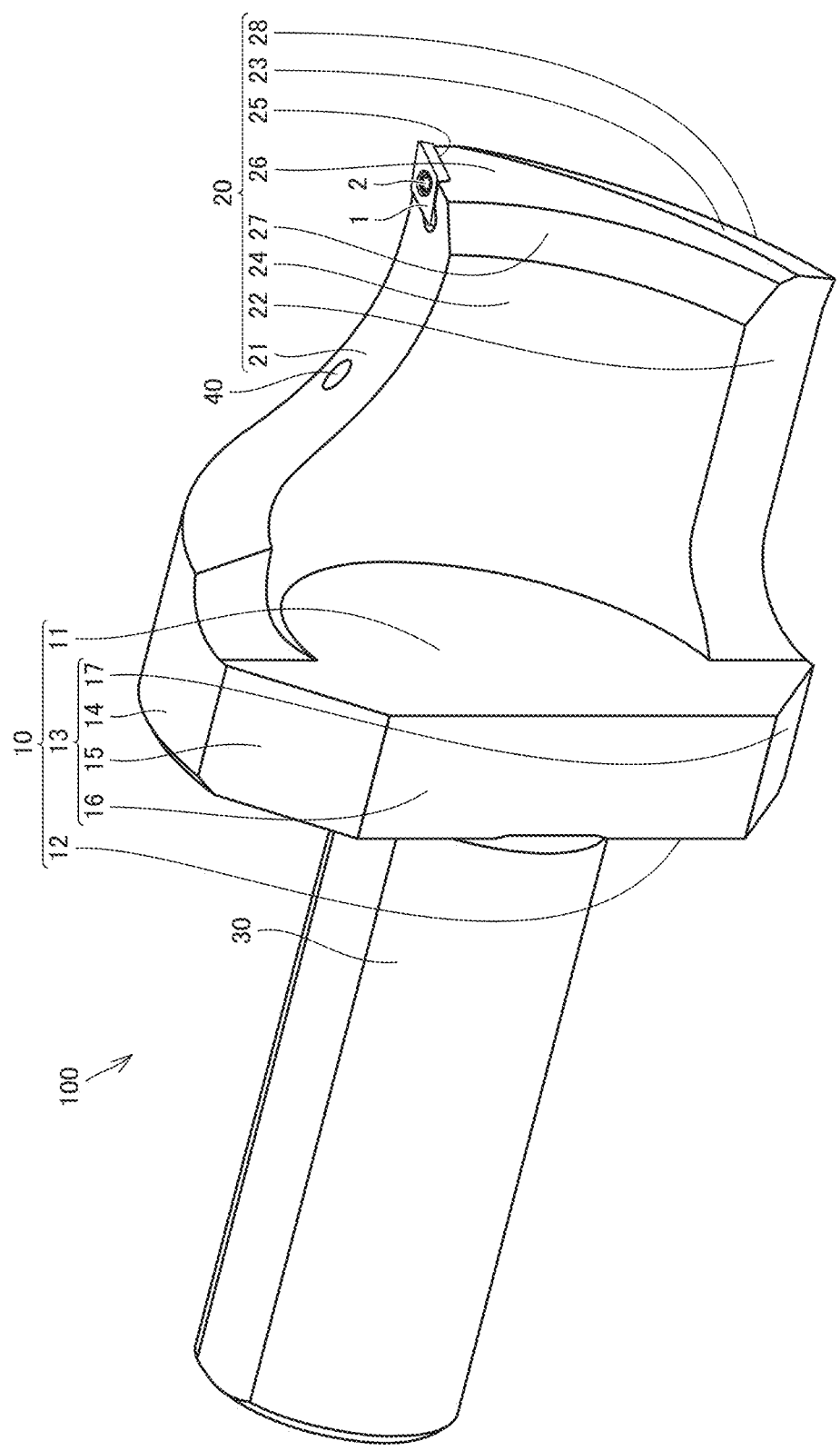
FIG. 11 is a schematic perspective view showing a configuration of a turning tool according to the second embodiment.

Hereinafter, a configuration of turning tool 100 according to the second embodiment will be described. FIG. 11 is a schematic perspective view showing the configuration of turning tool 100 according to the second embodiment. As shown in FIG. 11, turning tool 100 according to the second embodiment mainly comprises a boring tool holder 50 according to the second embodiment, cutting insert 1, and fixing member 2. Cutting insert 1 is attached to cutting insert holding member 20. Cutting insert 1 is fixed to cutting insert holding member 20 by using fixing member 2. Fixing member 2 is, for example, a screw. Cutting insert 1 is disposed in cutting insert receiving recess 25. When cutting insert 1 is disposed in cutting insert receiving recess 25, fixing member 2 is screwed into screw hole 29.

As shown in FIG. 11, cutting insert receiving recess 25 is provided at a location where distal end surface 23, first side end surface 21, and second external circumferential surface 28 meet one another. In this case, cutting insert 1 is disposed so as to project radially outward from second external circumferential surface 28.

Hereinafter, a method for cutting workpiece 60 using boring tool holder 50 according to the second embodiment will be described.

Figure 12:
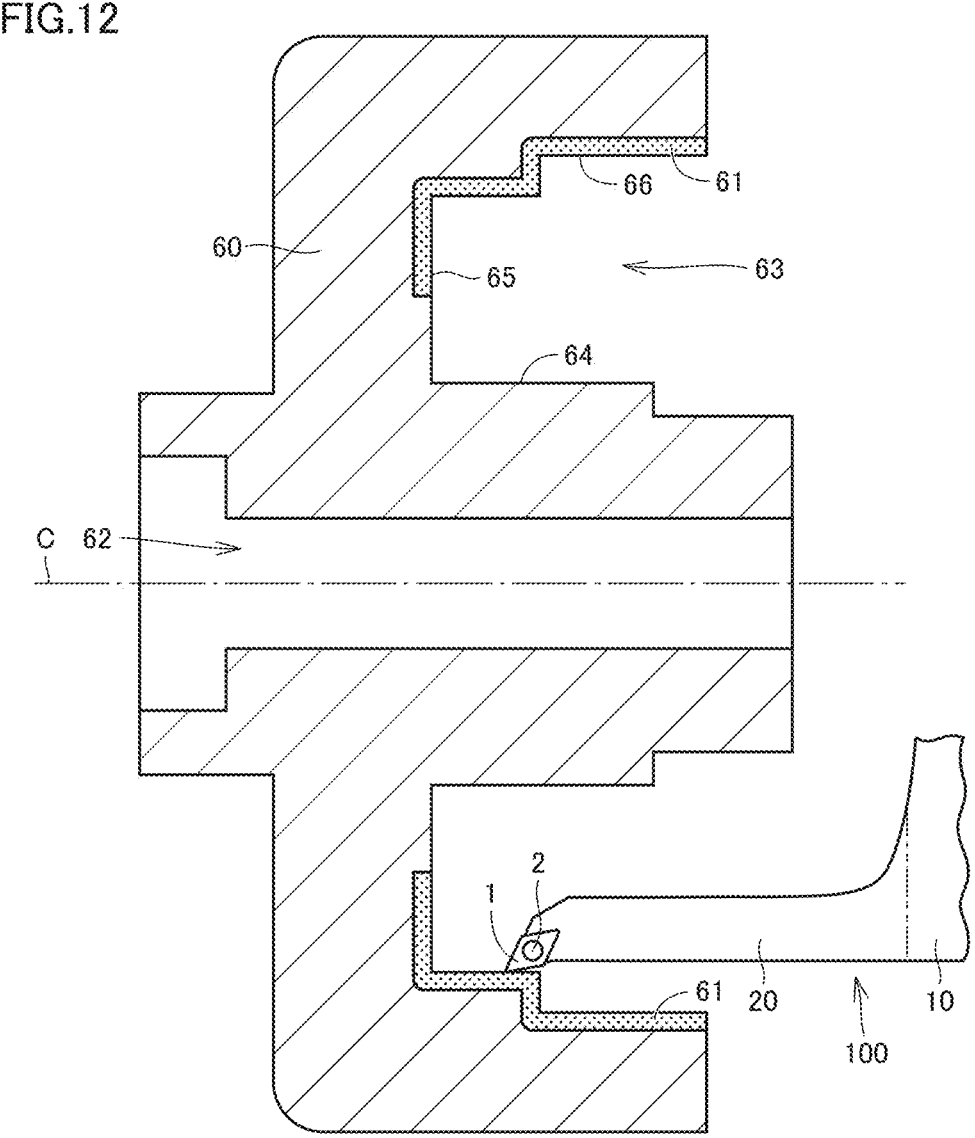
FIG. 12 is a schematic partial cross section showing a method for cutting a workpiece with the turning tool according to the second embodiment.

FIG. 12 is a schematic partial cross section showing a method for cutting workpiece 60 using turning tool 100 according to the second embodiment. Workpiece 60 is a component for an automatic transmission. As shown in FIG. 12, workpiece 60 is provided with annular groove 63 and through hole 62. Annular groove 63 surrounds through hole 62. Annular groove 63 is defined by inner circumferential surface 66, outer circumferential surface 64, and bottom surface 65. Workpiece 60 rotates about axis of rotation C. Turning tool 100 does not rotate, and instead provides a vertical movement, a lateral movement or a combination thereof to provide a translational movement in the plane of the sheet of FIG. 12.

Cutting insert 1 is disposed in cutting insert receiving recess 25 provided in boring tool holder 50. Cutting insert 1 held by boring tool holder 50 is pressed against inner circumferential surface 66 of annular groove 63 to cut inner circumferential surface 66. Cutting insert 1 is pressed against bottom surface 65 of annular groove 63 to cut about half of bottom surface 65 in FIG. 12, portion 61 to be worked is cut by cutting insert 1.

Hereinafter, a function and effect of boring tool holder 50 and turning tool 100 according to the above embodiment will be described.

According to boring tool holder 50 and turning tool 100 according to the above embodiment, cutting insert holding member 20 is disposed in circumferential direction A. When this is compared with a boring tool using an elongate rod-shaped holder, the former can enhance cutting insert holding member 20 in rigidity. Base member 10 has a cross-sectional area larger than that of cutting insert holding member 20. Cutting insert holding member 20 held by base member 10 having a cross-sectional area larger than that of cutting insert holding member 20 can be firmly held. As a result, boring tool holder 50 can be enhanced in rigidity as a whole.

When boring tool holder 50 as described above is used in turning workpiece 60 while it is rotated, boring tool holder 50, enhanced in rigidity, can suppress chattering. This results in a cut surface improved in surface roughness. In addition, dimensional accuracy can be stabilized. Further, turning tool 100 can have an extended lifetime.

Furthermore, for a boring tool using an elongated rod-shaped holder, it has been necessary to use a straight turning tool with a point corner when cutting bottom surface 65 of annular groove 63 provided in a component of an automatic transmission. In contrast, boring tool holder 50 and turning tool 100 according to the above embodiment can cut bottom surface 65 of annular groove 63. Thus, boring tool holder 50 and turning tool 100 according to the above embodiment eliminate the necessity of using a straight turning tool with a point corner, and can thus achieve efficient cutting.

Further, according to boring tool holder 50 and turning tool 100 according to the above embodiment, distal end surface 23 has a circumferential angle (first circumferential angle θ1) of 45° or larger and 180° or smaller when viewed in the direction from first main surface 11 toward second main surface 12. This can suppress interference with workpiece 60 while increasing rigidity.

Further, according to boring tool holder 50 and turning tool 100 according to the above embodiment, cutting insert holding member 20 has first side end surface 21 contiguous to distal end surface 23, and second side end surface 22 located on a side opposite to first side end surface 21 in circumferential direction A. First side end surface 21 has a smaller distance to first main surface 11 as first side end surface 21 is farther away from distal end surface 23 in circumferential direction A. This forms a pocket on the side of first side end surface 21 of cutting insert holding member 20. Chips can be effectively ejected via the pocket.

Further, according to boring tool holder 50 and turning tool 100 according to the above embodiment, first side end surface 21 may be arcuate when viewed in a direction perpendicular to the direction from first main surface 11 toward second main surface 12 and parallel to bottom surface 4 of cutting insert receiving recess 25. When this is compared with first side end surface 21 of a right angle, the former can enhance cutting insert holding member 20 in rigidity.

EXAMPLES

Hereinafter, a CAE (Computer Aided Engineering) analysis result will be described.

First, simulated models of boring tool holders of Samples 1 and 2 were produced. The boring tool holder according to Sample 1 is an example and has a shape shown in FIG. 1. The boring tool holder according to Sample 2 is a comparative example and is a standard boring tool holder in the form of an elongate rod.

The simulated models of the boring tool holders according to Samples 1 and 2 were used to calculate a maximum value in amount of displacement. Referring to FIGS. 6 and 12, a maximum value in amount of displacement means a maximum value in amount of displacement of a cutting edge of cutting insert 1 in a direction perpendicular to the plane of the sheet of the figure between before and after a load is applied to the rake face of the cutting edge of cutting insert 1. The direction perpendicular to the plane of the sheet of the figure is a direction of a principal component of a force of the rake face of the cutting edge. A direction of a principal component of a force means a direction substantially perpendicular to the rake face of the cutting edge of cutting insert 1, and corresponds to circumferential direction A indicated in FIG. 3. As simulation software, NX8 produced by SIEMENS was used. The simulation was conducted under the following conditions.

Feed: 0.4 mm/rev
Cutting Rate: 120 m/min
Depth of Cut: 2 mm
Specific Cutting Resistance: 1400 MPa
Load Set: 1.12 kN Referring to FIGS. 6 and 12, the load was applied to the rake face of the cutting edge of cutting insert 1 in a region of 0.4 mm in a lateral direction and 2 mm in a vertical direction. The value of the specific cutting resistance is a value set with gray iron assumed as a workpiece.

TABLE 1

| sample Nos. | maximum value in amount of deformation |
|---|---|
| sample 1 | 0.0373 mm |
| sample 2 | 0.8590 mm |

Table 1 shows maximum values in amount of displacement of the boring tool holders according to Samples 1 and 2. As shown in Table 1, the boring tool holder according to Sample 1 had a maximum value in amount of displacement of 0.0373 mm. In contrast, the boring tool holder according to Sample 2 had a maximum value in amount of displacement of 0.8590 mm. The maximum value in amount of displacement of the boring tool holder according to Sample 1 was about 1/23 of the maximum value in amount of displacement of the boring tool holder according to Sample 2. From the above result, it has been confirmed that the boring tool holder according to Sample 1 can provide a reduced maximum value in amount of displacement as compared with the boring tool holder according to Sample 2.

It should be understood that the embodiments disclosed herein have been described for the purpose of illustration only and in a non-restrictive manner in any respect. The scope of the present invention is defined by the terms of the claims, rather than the description above, and is intended to encompass any modifications within the meaning and scope equivalent to the terms of the claims.

REFERENCE SIGNS LIST 1 cutting insert, 2 fixing member, 3 side surface, 4 bottom surface, 10 base member, 11 first main surface, 12 second main surface, 13 first external circumferential surface, 14 curved surface, 15 first notched surface, 16 second notched surface, 17 third notched surface, 20 cutting insert holding member, 21 first side end surface, 22 second side end surface, 23 distal end surface, 24 second internal circumferential surface, 25 cutting insert receiving recess, 26 front surface, 27 first internal circumferential surface, 28 second external circumferential surface, 29 screw hole, 30 shank member, 40 coolant discharge hole, 41 coolant introduction hole, 50 boring tool holder, 60 workpiece, 61 portion to be worked, 62 through hole, 63 annular groove, 64 outer circumferential surface, 65 bottom surface. 66 inner circumferential surface, 100 turning tool, A circumferential direction, B center, C axis of rotation.

The invention claimed is:

1. A boring tool holder comprising:
a base member having a first main surface and a second main surface opposite to the first main surface; and
a cutting insert holding member contiguous to the base member on the first main surface, and disposed in a circumferential direction of the base member as viewed in a direction from the first main surface toward the second main surface,
a cross-sectional area of the base member in a cross section perpendicular to the direction from the first main surface toward the second main surface and intersecting the base member being larger than a cross-sectional area of the cutting insert holding member in a cross section perpendicular to the direction from the first main surface toward the second main surface and intersecting the cutting insert holding member, wherein
the base member has a first external circumferential surface that is continuous to each of the first main surface and the second main surface,
the first external circumferential surface has a curved surface,
the curved surface of the first external circumferential surface is arcuate when viewed in the direction from the first main surface toward the second main surface, and
the cutting insert holding member is disposed in a circumferential direction of the curved surface of the first external circumferential surface.

2. The boring tool holder according to claim 1, further comprising a shank member contiguous to the base member on the second main surface, wherein
the shank member is disposed without overlapping the cutting insert holding member as viewed in the direction from the first main surface toward the second main surface.

3. The boring tool holder according to claim 2, wherein the cutting insert holding member has a distal end surface located on a side opposite to the first main surface.

4. The boring tool holder according to claim 3, wherein the distal end surface has a circumferential angle of 45° or larger and 180° or smaller as viewed in the direction from the first main surface toward the second main surface.

5. The boring tool holder according to claim 1, wherein the cutting insert holding member has a distal end surface located on a side opposite to the first main surface.

6. The boring tool holder according to claim 5, wherein the distal end surface has a circumferential angle of 45° or larger and 180° or smaller as viewed in the direction from the first main surface toward the second main surface.

7. The boring tool holder according to claim 6, wherein
the cutting insert holding member has a first side end surface contiguous to the distal end surface, and
a distance of the first side end surface to the first main surface decreases from a boundary between the distal end surface and the first side end surface towards a boundary between the first main surface and the first side end surface in the circumferential direction of the base member.

8. The boring tool holder according to claim 7, wherein
the cutting insert holding member is provided with a cutting insert receiving recess, and
the first side end surface is arcuate when the cutting insert holding member is viewed in a direction perpendicular to the direction from the first main surface toward the second main surface and parallel to a bottom surface of the cutting insert receiving recess.

9. The boring tool holder according to claim 5, wherein
the cutting insert holding member has a first side end surface contiguous to the distal end surface, and
a distance of the first side end surface to the first main surface decreases from a boundary between the distal end surface and the first side end surface towards a boundary between the first main surface and the first side end surface in the circumferential direction of the base member.

10. The boring tool holder according to claim 9, wherein
the cutting insert holding member is provided with a cutting insert receiving recess, and
the first side end surface is arcuate when the cutting insert holding member is viewed in a direction perpendicular to the direction from the first main surface toward the second main surface and parallel to a bottom surface of the cutting insert receiving recess.

11. A turning tool comprising:
the boring tool holder according to claim 1; and
a cutting insert attached to the cutting insert holding member.

12. The turning tool according to claim 11:
wherein the boring tool holder further comprising a shank member contiguous to the base member on the second main surface, wherein
the shank member is disposed without overlapping the cutting insert holding member as viewed in the direction from the first main surface toward the second main surface.

13. The turning tool according to claim 10,
wherein the cutting insert holding member has a distal end surface located on a side opposite to the first main surface.

14. The turning tool according to claim 13, wherein the distal end surface has a circumferential angle of 45° or larger and 180° or smaller as viewed in the direction from the first main surface toward the second main surface.

15. The turning tool according to claim 13, wherein
the cutting insert holding member has a first side end surface contiguous to the distal end surface, and
a distance of the first side end surface to the first main surface decreases from a boundary between the distal end surface and the first side end surface towards a boundary between the first main surface and the first side end surface in the circumferential direction of the base member.

16. The turning tool according to claim 15, wherein
the cutting insert holding member is provided with a cutting insert receiving recess, and
the first side end surface is arcuate when the cutting insert holding member is viewed in a direction perpendicular to the direction from the first main surface toward the second main surface and parallel to a bottom surface of the cutting insert receiving recess.

\* \* \* \* \*

UNITED STATES PATENT AND TRADEMARK OFFICE
CERTIFICATE OF CORRECTION

PATENT NO. : 12,202,052 B2  
APPLICATION NO. : 17/610699  
DATED : January 21, 2025  
INVENTOR(S) : Hitoshi Tohkairin Page 1 of 1

It is certified that error appears in the above-identified patent and that said Letters Patent is hereby corrected as shown below:

In the Claims

Column 12, Line 51, after "claim" delete "10" and insert --11--.

Signed and Sealed this  
Twenty-second Day of April, 2025

Coke Morgan Stewart  
*Acting Director of the United States Patent and Trademark Office*